Aug. 17, 1926.
R. D. PIKE
1,596,509
APPARATUS FOR CALCINING AND CLINKERING WITH RECOVERY OF BY-PRODUCT
HEAT AND BY-PRODUCTS
Filed August 21, 1924
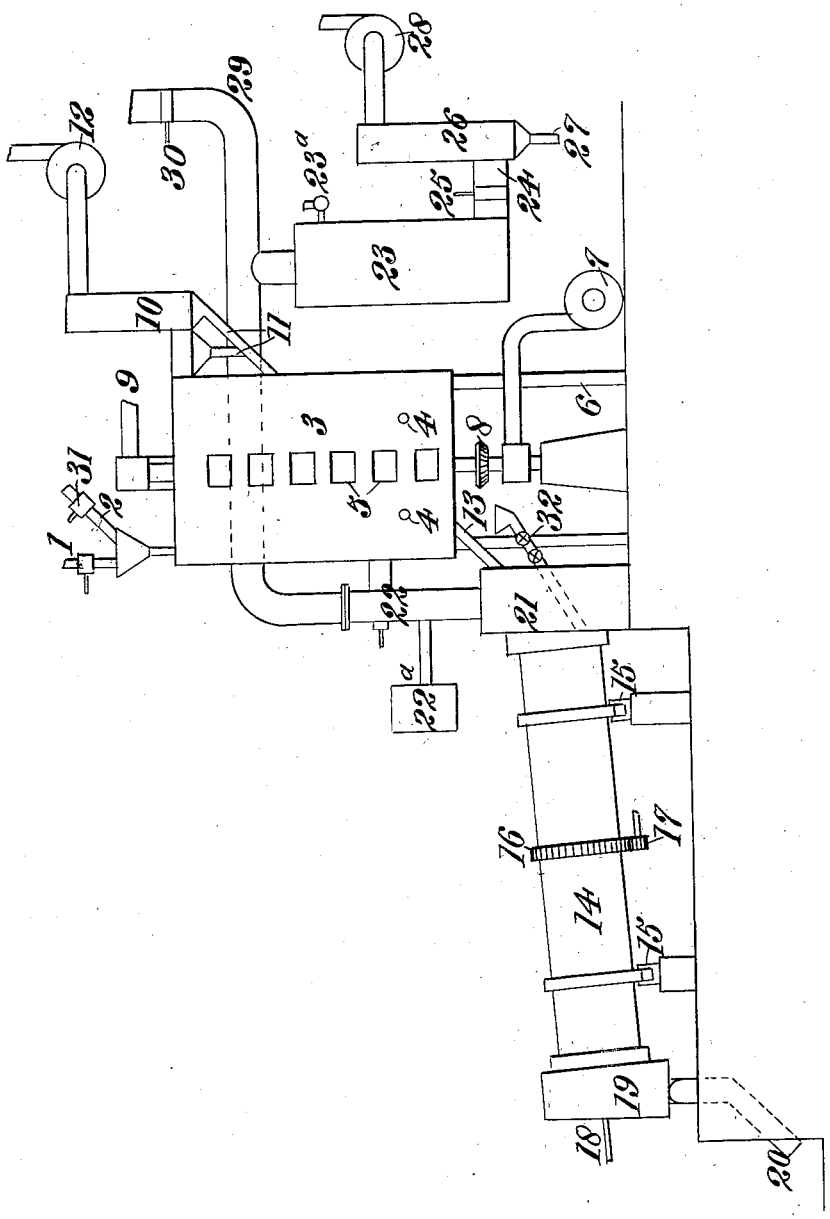

Patented Aug. 17, 1926.

1,596,509

UNITED STATES PATENT OFFICE.

ROBERT D. PIKE, OF SAN MATEO, CALIFORNIA.

APPARATUS FOR CALCINING AND CLINKERING WITH RECOVERY OF BY-PRODUCT HEAT AND BY-PRODUCTS.

Application filed August 21, 1924. Serial No. 733,317.

The present invention relates to an apparatus for calcining and clinkering and the recovery of the by-products, also the by-product heat.

This present apparatus delivers the waste gases from the clinkering element away from the calcining element and enables their use and treatment in other ways for the recovery of by-products, and also permits of maintaining separate atmospheres in the calcining and clinkering elements respectively whereby a lesser concentration of oxygen is present in the calcining element than in the clinkering element.

When the raw mix for Portland cement manufacture contains pyrite ($FeS_2$) this compound must be oxidized to sulphur ($SO_2$) and $Fe_2O_3$ because otherwise an injurious amount of sulphur may remain in the clinker. In ordinary practice in the manufacture of Portland cement clinker in rotary kilns, this is accomplished by admitting a considerable surplus of air over that required for combustion, thereby increasing fuel consumption.

In my present apparatus the process of calcining is carried out at high thermal efficiency in an atmosphere containing but little surplus air over the requirements of combustion, and, consequently, only a portion of the sulphides such as pyrite, if present, are oxidized. The residual sulphides from the calciner pass with the hot calcined raw mix into the clinkering element where a surplus of air is maintained together with a very high temperature of from 2500° F. to 2800° F. Under these conditions clinker is formed and practically all of the sulphur oxidized to $SO_2$ and $SO_3$, and all of the alkalies present, i. e., $K_2O$ and $Na_2O$ are volatilized. These fumes then pass to any suitable form of recovery apparatus where they unite to form solid potassium sulphate ($K_2SO_4$) and sodium sulphate ($Na_2SO_4$). If the fume laden gases from the clinkering element are passed into the calcining element they tend to form sticky compounds with the CaO there present, which compounds tend to adhere to and build up on the surfaces within the calciner. It is, therefore, advantageous in itself not to pass these gases into the calciner aside from the advantage which accrues from the recovery of the alkali sulphates.

By my present apparatus the waste gases issue from the clinkering element at about 2000° F. and are cooled by suitable mechanism prior to being treated or electrically precipitated for the recovery of their contained $K_2SO_4$ and some $Na_2SO_4$ and in cooling my utilization of a waste heat boiler for reducing the temperature of such gases enables the recovery of heat in a useful form.

To more thoroughly understand the apparatus invention, attention is directed to the accompanying drawing, one figure, and in which the numeral 1 indicates a feed conveyer of any suitable type for delivering Portland cement raw mix to a feed box 2. The feed box discharges into a calciner 3, of the mechanically rabbled multiple hearth type, with suitable modifications and details not shown, for permitting the interior rabbling mechanism to withstand the high temperatures necessary for calcination. The calciner 3 is provided with the usual working doors 5 and burners 4, the latter adapted to supply either liquid, gaseous, or pulverized fuel, and the necessary air for combustion into the calciner. If desirable, the calciner may be supported on posts 6 and the cooling air for the rabbling mechanism may be supplied by blower 7, while the rabbling mechanism is driven in rotation by gear mechanism 8. The cooling air for the rabbling mechanism escapes therefrom through the outlet 9, at the upper end of the calciner 3 and the gases of combustion are withdrawn from the calciner by the exhauster 12 and in their passage thereto are caused to pass through an electrical precipitator 10 illustrated in a conventional form and of a well-known type capable of being readily purchased on the open market. The collected dust is returned from the precipitator 10 to the upper end of the calciner through the pipes 11.

The hot calcined material as it discharges from the lower end of the calciner 3 passes or drops through the feed pipe 13 into the upper end of a rotary kiln 14 rotatively mounted on tires 15 and driven through an intermeshing girth gear 16 and pinion 17. A burner 18 extended into the lower end of the kiln through the firing hood 19 supplies clinkering heat thereto in the direction opposing the discharge of the clinkered material from the kiln 14 which drops from the firing hood through the outlet 20. The upper end of the rotary kiln 14 terminates in the usual hood or chamber 21 upwardly from which extends a stack 22 for conveying the hot gases therefrom. The extension 29 of the stack 22 mounts a damper 30 which controls the flow of the gases through the stack, and inwardly from said damper 30 there branches from the stack 22 a duct connecting the stack with a waste heat boiler 23 of any well known type, provided with a steam outlet or escape 23$^a$. Adjacent the waste heat boiler is positioned a suitable precipitator 26, preferably of the electrical type, provided with an outlet 27, and said precipitator is connected with the cooler end of the waste heat boiler 23 by a duct 24, and into said duct extends a fluid injector spray pipe 25, all of which is conventionally shown in the drawings.

To maintain a circulation of gas through the precipitator 26, an exhaust fan 28 or other circulatory means may be employed.

To enable the addition of the small requisite quantity of sulphur for fixing the alkalies in the form of pyrite or pyrrholite to the raw mix entering the calciner 3 through feed box 2, if sufficient of such sulphides are not naturally present, I provide a conventional feed conveyer 31, of the valve controlled type, and if the pyrite or pyrrholite is to be added to the hot calcined mix on its entering the clinkering element, it may be supplied through gate controlled hopper 32.

If it be found more desirable to supply the deficiency in sulphur, if such exist, in the form of a gas, a sulphur or pyrite burner 22$^a$ may be provided in a convenient location to communicate with the interior of stack 22, above hood 21 to introduce $SO_2$ gas into said stack.

I claim:—

In combination with a calcining means, a separate clinkering means, means for conveying hot calcined material from the calcining means to the clinkering means, a flue leading from the clinkering means for conveying hot gases therefrom, a precipitator within the flue for treating the gases for the recovery therefrom of their alkali content, cooling means in said flue intermediate the precipitator and clinkering means, and means for supplying a deficiency of sulphur to said flue intermediate said clinkering means and said cooling means.

In testimony whereof I have signed my name to this specification.

ROBERT D. PIKE.